United States Patent
Bratten

(12) 
(10) Patent No.: US 6,235,209 B1
(45) Date of Patent: May 22, 2001

(54) AUXILIARY FILTER AND PROCESS FOR REMOVING RESIDUAL PARTICLES FROM FILTERED CUTTING FLUID

(76) Inventor: Jack R. Bratten, 5970 St. James Dr., West Bloomfield, MI (US) 48322

( * ) Notice: Subject to any disclaimer, the term of this patent is extended or adjusted under 35 U.S.C. 154(b) by 0 days.

(21) Appl. No.: 09/426,866

(22) Filed: Oct. 26, 1999

(51) Int. Cl.[7] .......................... B01D 33/073; B01D 33/50
(52) U.S. Cl. .................... 210/784; 210/791; 210/805; 210/167; 210/168; 210/391; 210/398; 210/402; 210/409
(58) Field of Search ................................ 210/784, 791, 210/797, 402, 407, 408, 409, 415, 167, 168, 805, 391, 398

(56) References Cited

U.S. PATENT DOCUMENTS

| | | | |
|---|---|---|---|
| 785,531 | * | 3/1905 | Weller .................................. 210/402 |
| 1,712,258 | * | 5/1929 | Compain .............................. 210/408 |
| 4,772,402 | * | 9/1988 | Love ................................. 210/195.1 |
| 4,895,647 | * | 1/1990 | Uchiyama ............................. 210/171 |
| 4,992,167 | * | 2/1991 | Uchiyama ............................. 210/171 |
| 5,328,611 | * | 7/1994 | Lenhart ................................ 210/402 |

\* cited by examiner

*Primary Examiner*—Robert Popovics
(74) *Attorney, Agent, or Firm*—John R. Benefiel

(57) ABSTRACT

An auxiliary filter for removing residual particles from already filtered cutting fluids used in metal cutting machines, the auxiliary filter including a hollow wheel member rotated in a sealed tank into which the filtered liquid flows. Pressurized liquid passes through a fine screen on the perimeter of the rotating wheel to capture any residual particles. A high pressure backwash jets are directed at the screen as it rotates past an array of nozzles, and a collection trough draws any dislodged material away and out of the tank.

4 Claims, 3 Drawing Sheets

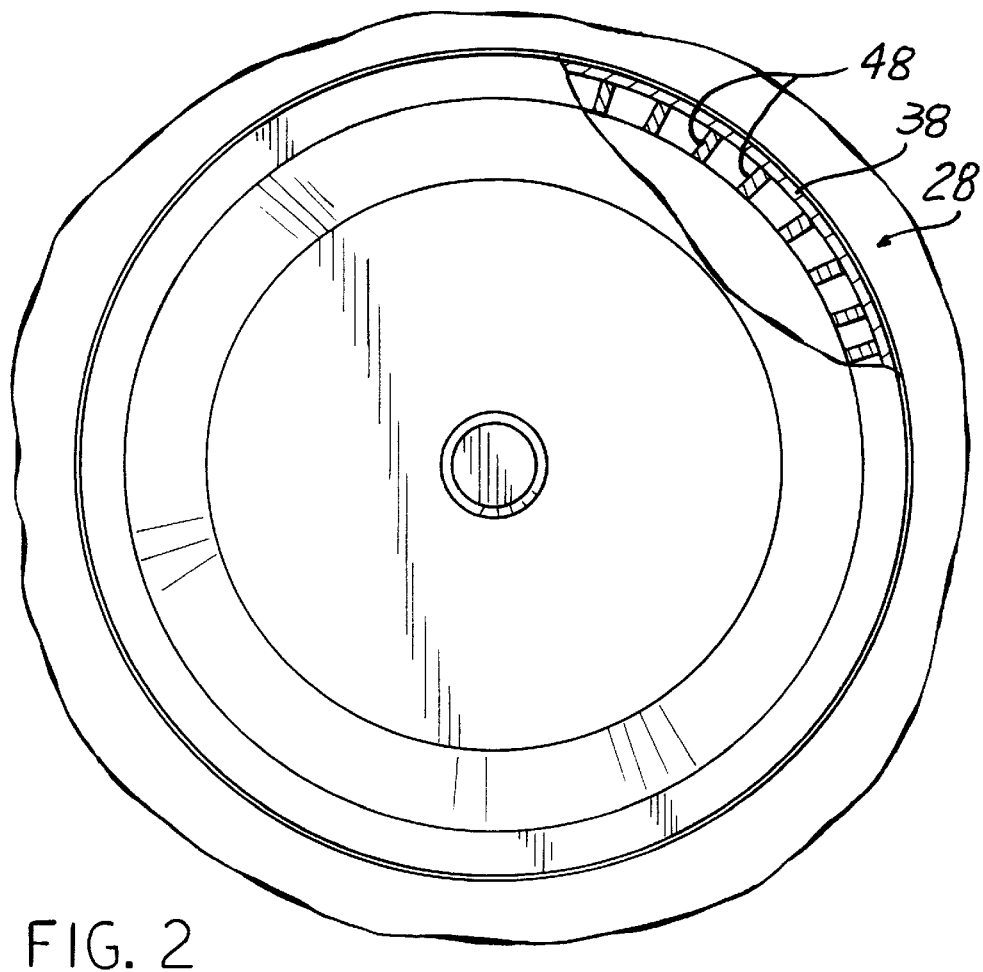
FIG. 2
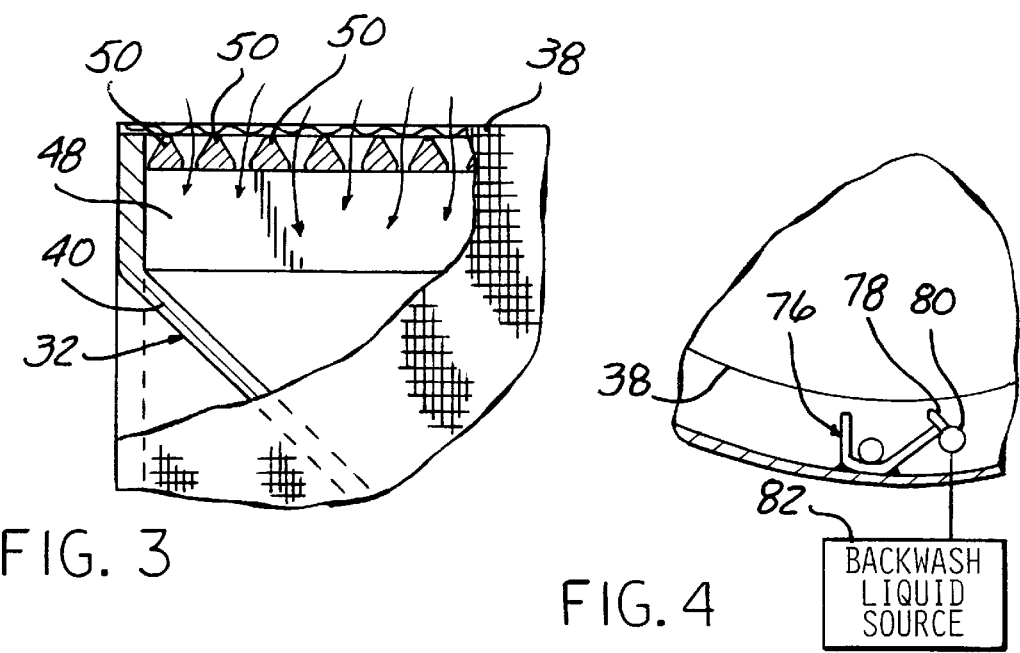
FIG. 3
FIG. 4

AUXILIARY FILTER AND PROCESS FOR REMOVING RESIDUAL PARTICLES FROM FILTERED CUTTING FLUID

BACKGROUND OF THE INVENTION

This invention concerns filters and more particularly filters used to remove contaminating particles from cutting fluids used in metal working machining.

Large volumes of contaminated cutting liquids are generated in the machining of metal in large scale metal cutting operations such as in the manufacture of engine components in the automotive industry. These liquids are filtered to remove solid particles such as grit, metal chips, etc. in a recirculating system, which returns the filtered liquid for reuse with the machine. The volumes of liquids required for large machining installations has led to the use of indexing belt filters circulated through large tanks.

See U.S. Pat. No. 5,601,729 for an example of such filtering apparatus.

These filters allow great volumes of liquid to be filtered, but do not totally eliminate the presence of stray particles which can get around the edges of the belts, pass through tears in the belt, or otherwise get into the filtered liquid.

Even one metal chip can cause plugging of a coolant nozzle for a machine tool, creating rapid tool failure and possible shut down of the entire installation.

There is thus a need for a failsafe auxiliary filter for removing residual particles from the filtered liquid.

A particular problem associated with cutting fluids in particular is the build up of gelatinous material which has a great tendency to rapidly plug up fine filter openings, such that it is not practical to use fine screen filters to eliminate these stray particles. Also, such apparatus is often operated continuously with automatic controls, and any auxiliary filters used desirably should not require constant maintenance.

It is the object of the present invention to provide a filter and process for filtering out residual particles from filtered cutting fluids recirculated from a machining operation.

SUMMARY OF THE INVENTION

The above object and others which will be understood upon a reading of the following specification and claims are achieved by an auxiliary filter comprised of a hollow wheel member carrying a filter screen on its perimeter, the wheel continuously rotated in a sealed tank receiving under pressure the filtered liquid. The hollow wheel member has an outer cylindrical perimeter covered with a fine screen supported by wedge wire windings and a circumferential array of bars welded to the outer portion of oppositely dished hub pieces. The hub pieces are axially spaced apart to define a flow path for liquid received under pressure from the main filter apparatus and flowing through the fine screen, which is thereafter directed back to the machining center.

The screen is backwashed by a series of high pressure jets directed at the screen as it rotates past the jets. An open side of a collection trough faces the screen at the location of the spray jets, to collect dislodged material and draw the same out of the tank.

The combination of the rotation of the wheel and the cleaning effect of the backwash jets keeps the fine screen clear of both gelatinous material and any captured residual particles so as to allow continuous operation of the auxiliary filter.

DESCRIPTION OF THE DRAWING FIGURES

FIG. 2 is a partially sectional end view of the hollow wheel member included in the filter of FIG. 1.

FIG. 3 is an enlarged fragmentary view of a portion of the hollow wheel in partial section showing details of the support for a fine screen extending about the perimeter of the hollow wheel.

FIG. 4 is an end view of the collection trough and spray nozzle away shown in FIG. 1.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
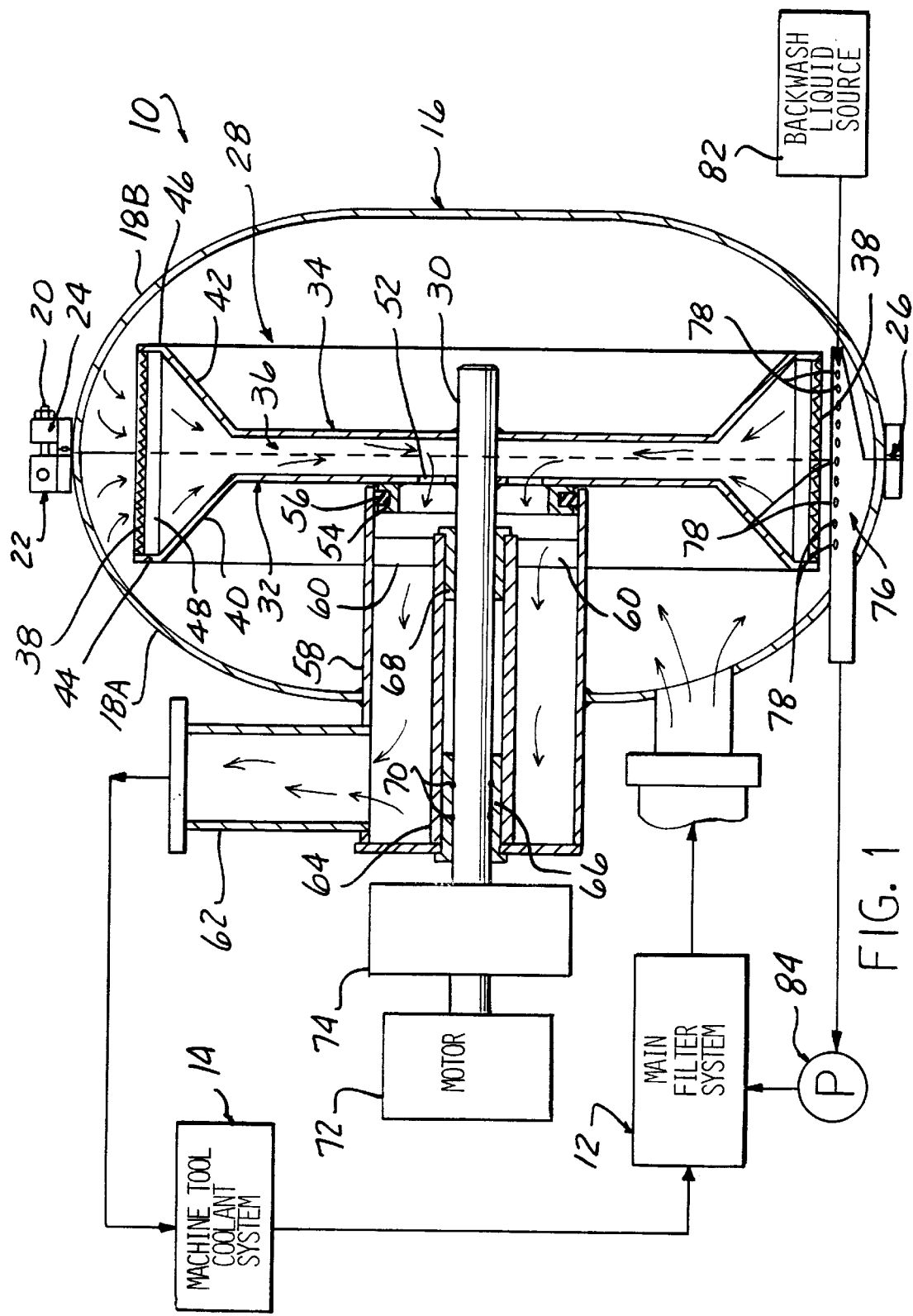
FIG. 1 is a sectional view of the filter according to the present invention with diagrammatic representations of the associated components.

Referring to the drawings and particularly FIG. 1, the auxiliary filter apparatus 10 according to the present invention is designed for use with a main filter system 12 which is associated with a machine tool coolant system 14.

The filtered cutting fluid from the main filter system 12 is directed under pressure into a sealed tank 16, which is constructed of two separable halves 18A, 18B secured together by swing bolts 20 and flanges 22, 24. A perimeter gasket 26 insures a pressure tight sealing of the tank 16.

A hollow wheel member 28 completely enclosed within the tank submerged in the pressurized liquid, and is rotatably supported within the tank 16 on a drive shaft 30 passing through the wheel 28 and welded to a pair of oppositely dished disk pieces 32, 34. The disk pieces 32, 34 are spaced apart axially to define a radial flow space 36 to receive inflow through a fine microscreen 38 extending around the outer perimeter of the hollow wheel 28.

The outer region 40, 42 of each of the disk pieces 32, 34 are flared away from each other to create a widened axial spacing to accommodate an increased width of the fine microscreen 38 to increase the filtering area available.

The microscreen 38 is a commercially available sheet material having very fine openings (25–300 microns), and is constructed of thin sheet metal only a few thousandth's thickness to be incapable of being scraped and must be supported at closely spaced intervals.

For this application a 50–70 micron size would typically be used. The details of this support structure is shown in FIG. 3. The flared portions 40, 42 extend to radial rim portions 44, 46, and a circumferentially spaced array of thin bars 48 are welded at each end to a respective rim portion 44, 46. Turns of a commercially available triangular in-section wire (called wedgewire) are wound onto the outer faces of the bars 48 and welded thereto, with the peaked side of the range facing out to increase the open area beneath the screen 38. The pressurized liquid passes through the mesh 38, between the wedgewire turns and then between the thin bars 48 and into the interior space 36.

The left disk piece 32 has a series of holes 52 at an inner region allowing outflow from space 36. A sealing ring 54 is welded to the outer surface of the disk piece 32 and carries a rotary seal 56 engaging the inside of an axially extending central tube 58 welded to tank half 18A.

The central tube 58 is supported on a series of radial webs 60 to allow liquid flow into the interior of tube 58 and thence to an outlet 62.

A spacer tube 64 holds a pair of bearing sleeves 66, 68 journalled on the shaft 30, with rotary seals 70 insuring that no leakage out of the tank 16 occurs.

A drive motor 72 and gear reducer 74 power the shaft 30 to provide rotation of the hollow wheel 28 at a speed sufficient to keep the screen 38 clear (15–20 surface feet per second) when combined with the effects of a backwashing spray.

A collection trough 76 is fixed to the inside of the tank 16, with its open side facing the outer perimeter of the hollow wheel 28, and a series of spray nozzles 78 project from a backwash header pipe 80 (FIG. 4) supplied with over tank pressure liquid from a source 82 (such as a reservoir of filtered liquid) pressurized to a level substantially over the pressure in the tank 16, i.e., 100–300 psi higher than tank pressure to create spray jets directed at the screen 38 covering each portion as the screen 38 is rotated past the spray nozzles 78. An outlet 84 connects the trough to a low pressure side of a backwash return pump 84 to direct collected liquid into the main filter system 12. The trough 76 and outflow current in the vicinity of the spray jets collects material dislodged from the screen 38 and carries it out of the tank 16.

The combination of rotating movement of the screen 38 and the spray nozzle jets keeps the screen 38 clear of solid particles and gelatinous material to allow continuous operation of the auxiliary filter 10, insuring that no residual particles of any size are recirculated into the machine tool coolant system 14.

The backwashing may be operated continuously (where considerable gelatinous material is present), or may be operated intermittently to allow solids to accumulate for better filtration. The wheel 28 may in this case also be merely indexed rather than the more usual continuous rotation.

Figure 5:
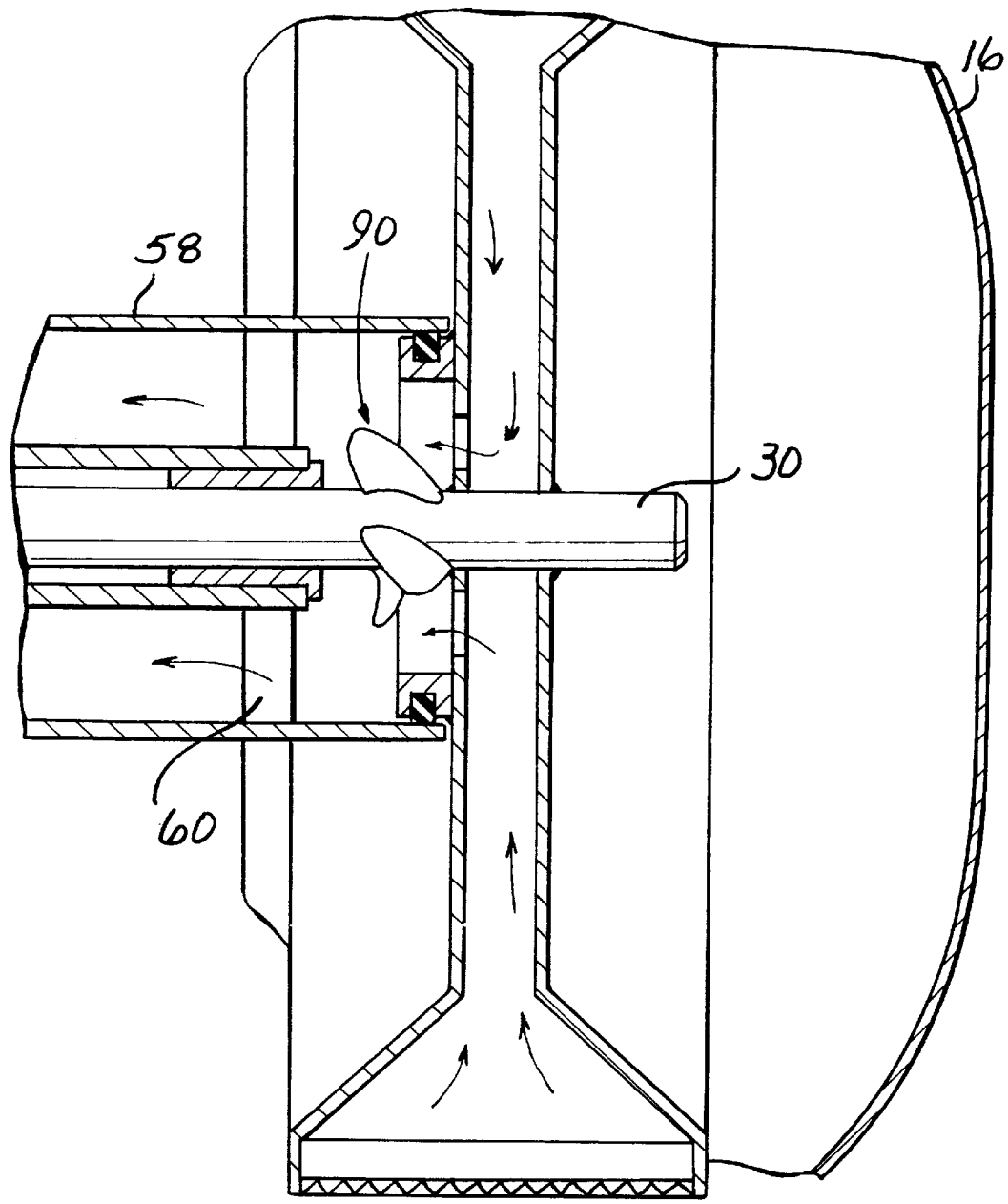
FIG. 5 is an enlarged fragmentary view of a portion of the filter shown in FIG. 1, showing an optional modification.

FIG. 5 shows that an axial flow propeller 90 can be driven by shaft 30 so as to boost the pressure of the exiting liquid, offsetting the losses experienced in passing through the auxiliary filter 10.

What is claimed is:

1. A process of filtering cutting fluids used in a metal cutting machine comprising the steps of collecting cutting fluids contaminated with solid particles and other material in said metal cutting machine and passing said fluid through a main filter apparatus to remove said particles and other material therefrom;

directing pressurized filtered liquid from said main filter apparatus into a closed sealed tank enclosing an auxiliary filter to remove residual particles, said auxiliary filter including a hollow member having a filter screen mounted about an open outer perimeter extending about a central axis;

rotating said hollow member about said axis while said member is completely enclosed in said tank of pressurized filtered liquid;

causing pressurized liquid in said tank to flow through said screen and into a liquid receiving hollow space in said hollow member;

directing a series of spray jets of liquid under a pressure higher than existing in said tank at said screen as said screen is rotated past said jets to thereby clean said screen as it is rotated past said spray jets, said rotation producing a screen surface speed velocity sufficiently high to also tend to dislodge particles and other material from said screen so that together with the effects of directing spray jets at said screen, said screen is maintained clean of said particles and other material; and drawing particles and other material dislodged from said screen into an outflow of liquid from said tank creating a flow current passing along the vicinity of said spray jets; and returning liquid drawn into said hollow member through said screen from said tank back to said metal cutting machine.

2. The process according to claim 1 wherein in said step of rotating said hollow member, a surface velocity of said screen of about 15–20 fee per second is attained.

3. The process according to claim 1 further including the step of continuously rotating said hollow member and directing said spray jets at said screen to continuously clean said screen.

4. The process according to claim 1 wherein the step of drawing particles into an outflow includes the step of disposing an open face of a trough across the perimeter of said rotating screen at the location of said spray nozzles, and drawing liquid out of said trough and said tank to collect said particles and other material dislodged from said screen by said spray jets and rotation of said hollow member.

* * * * *